Dec. 15, 1964     A. LARSON     3,161,390
OUTRIGGER POLE BRACKET FOR FISHING BOATS
Filed Nov. 14, 1962     2 Sheets-Sheet 2
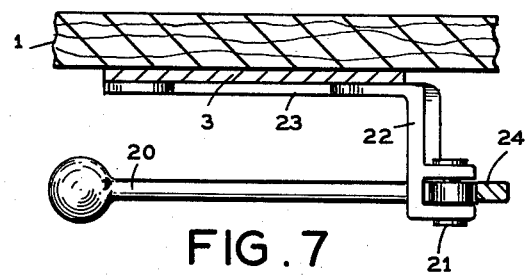
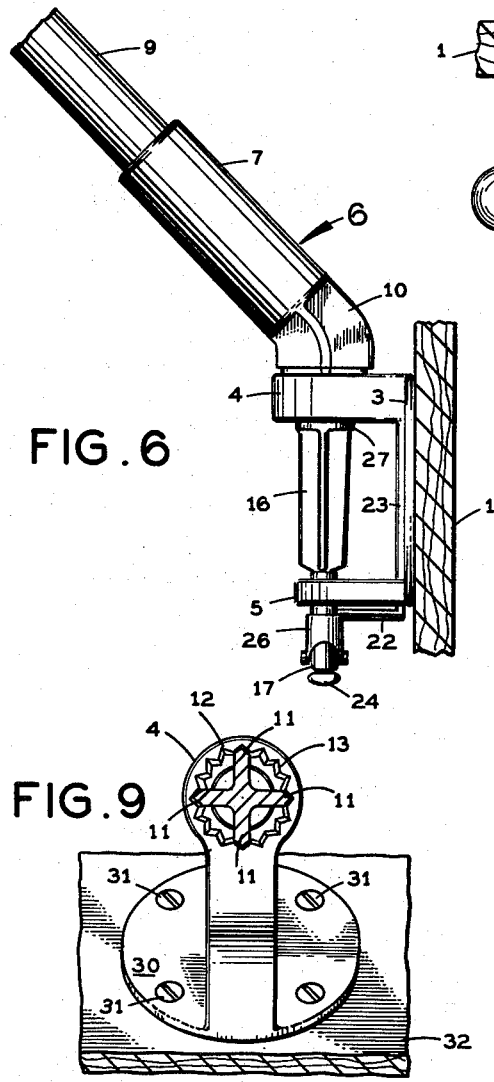
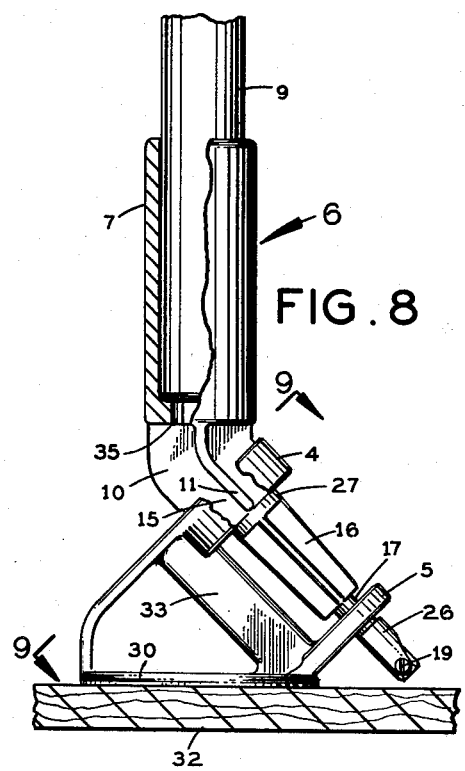
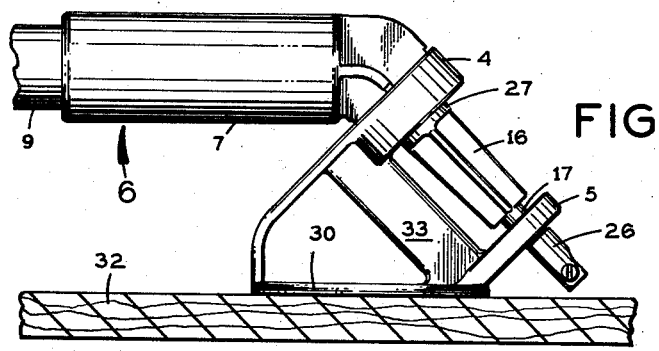
INVENTOR.
ARVID LARSON
BY
ATTORNEY United States Patent Office 3,161,390
Patented Dec. 15, 1964

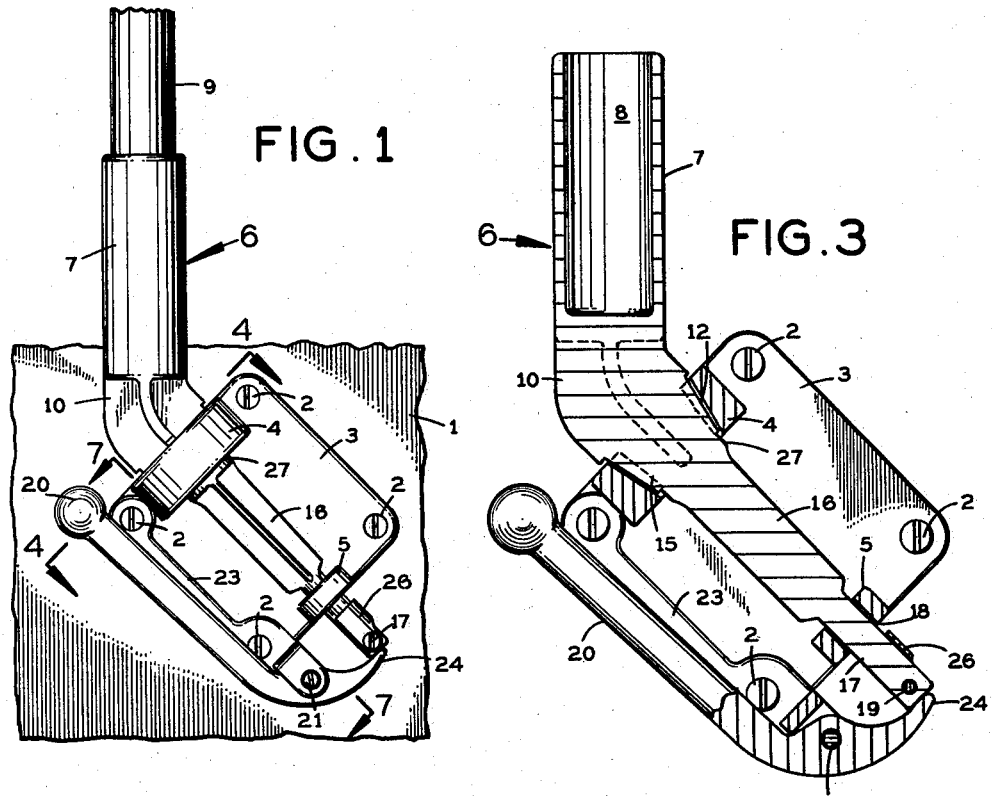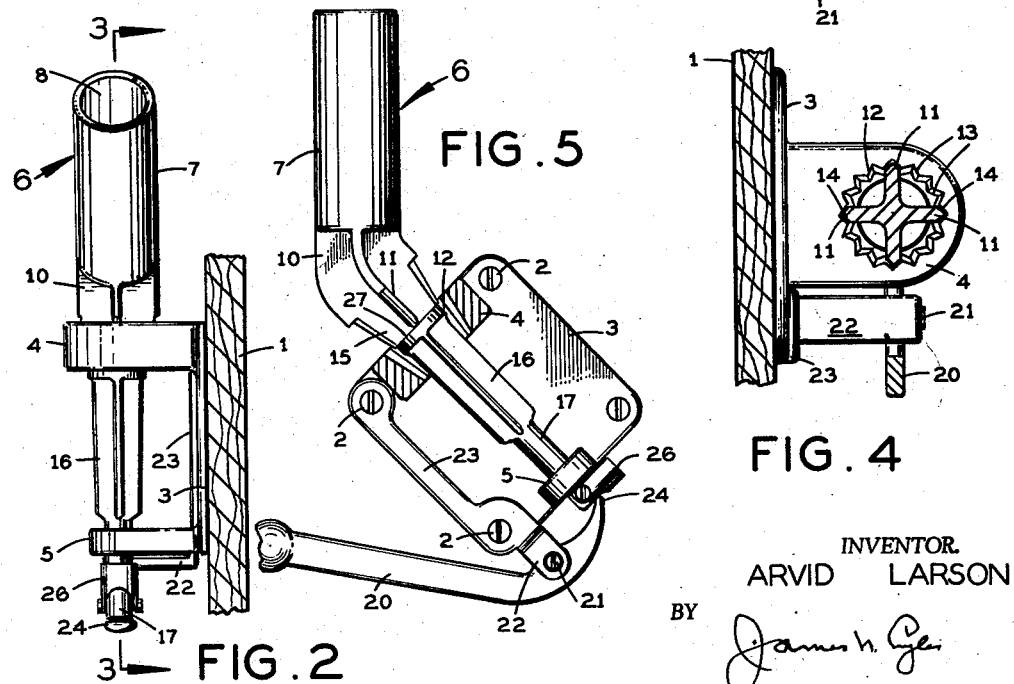

3,161,390
OUTRIGGER POLE BRACKET FOR
FISHING BOATS
Arvid Larson, Fort Lauderdale, Fla., assignor to
Richard L. Jones, Fort Lauderdale, Fla.
Filed Nov. 14, 1962, Ser. No. 237,533
3 Claims. (Cl. 248—40)

This invention relates to outrigger brackets such as are employed as outrigger pole holders and which are attached to fixed portions of a boat and serve to hold a fishing line in a clip for trolling of other fishing purposes.

It is an object of the invention to provide a bracket of this character which can be securely fastened to a part of a boat cabin, to the deck of the boat or at other suitable positions on the boat structure, and which will be securely arranged to hold the outrigger pole in any one of a number of the required angular positions needed for the uses of the pole.

It is an object of the invention to provide a bracket of this character in which the position of the pole holder can be quickly changed without requiring the use of tools or the unfastening and tightening of bolts or screws, and by which the position of the holder will be securely maintained during the support and use of the pole.

More particularly, the invention contemplates the provision of a bracket adapted for attachment to either a horizontal or a vertical or other part of a boat structure, said bracket being provided with socket-supporting means or guides through which the shank of a tubular socket member, receiving the end portion of an outrigger pole, is mounted. Said tubular socket member is capable of a limited axial movement through its supporting means and when positioned in a certain position relative to the supporting means, the socket is positioned to be rotatively adjustable to enable it to have its pole-supporting part positioned at a selected angle, whereupon by a return axle movement, an interengagement of the socket member with the supporting means is had to prevent later inadvertent rotative shift of the socket member during the use of the device. Thus, the device is so deigned and constructed that while it permits quick and easy adjustment of the socket member to various angular positions, it cannot be shifted rotatively during the use of the outrigger pole.

With these and other objects to be hereinafter set forth in view, I have devised the arrangement of parts to be described and more particularly pointed out in the claims appended hereto.

In the accompanying drawings, wherein an illustrative embodiment of the invention is disclosed, FIG. 1 is a side elevational view of an outrigger bracket or outrigger pole holder constructed according to the present invention;

FIG. 2 is a front elevational view of the same;

FIG. 3 is a sectional view, taken substantially on the line 3—3 of FIG. 2, looking in the direction of the arrows;

FIG. 4 is a sectional view, taken substantially on the line 4—4 of FIG. 1, looking in the direction of the arrows;

FIG. 5 is a view similar to FIG. 1, but with some parts shown in section in order to disclose construction;

FIG. 6 is a front elevational view, similar to FIG. 3, but showing the rod-holding socket disposed at a different angle;

FIG. 7 is a sectional view, taken substantially on the line 7—7 of FIG. 1, looking in the direction of the arrows;

FIG. 8 is a side elevational view with parts in section, of another embodiment of the invention;

FIG. 9 is a sectional view, taken substantially on the line 9—9 of FIG. 8, looking in the direction of the arrows; and FIG. 10 is a side elevational view of the structure of FIGS. 8 and 9, but with the rod-holding socket disposed with its axis substantially parallel to the deck or other boat parts to which the bracket is attached.

Referring to the drawings, and more particularly to FIGS. 1 to 7 inclusive, a portion of the boat, such as the side wall of the cabin thereof, is indicated at 1, and secured thereto by suitable fastening elements such as screws 2 is the base plate 3 of the bracket. The same may be composed of a suitable non-corrosive metal, and it includes a pair of spaced, parallel and preferably integrally formed projecting lugs or guides indicated respectively at 4 and 5.

The rod holder, generally indicated at 6, includes a tubular socket portion 7 at one end, having a bore 8 into which the end or butt 9 of an outrigger pole is received. The socket 7 is effective to hold the rod in its extended position for trolling or for other purposes, and the rod may be held by the socket member in various positions of angularity according to the manner in which the holder is positioned in the bracket.

Extending from the rear end of the socket 7 and at an angle therefrom, is the shank 10 of the pole-holder. It is preferably formed as an integral extension of the socket 7. Adjacent to the rear end of the socket 7, the shank is formed with a tapering part 15 having a plurality of radial ribs or flanges 11, four of which are shown. In the seated or non-rotative position of the holder 6, the ribbed or flanged portion of the part 15 fits within a tapered passage or opening 12 extending through the lug or guide 4. The wall of the opening 12 is composed of serrations or teeth 13 which define grooves 14 between them. When the tapering part 15 of the shank is fitted in seated position in the passage 12, the ribs or flanges 11 fit into the grooves 14 between the serrations and the holder 6 is thus prevented from rotative movement.

The shank 10 of the pole holder 6 also includes a part 16 which is of less diameter than the narrowest portion of the passage 12 so that when the holder is so advanced that its ribs 11 are moved out of the passage 12, as shown in FIG. 5, the entire holder can then be rotatively moved within the bracket. Extending from the end of the reduced-diameter part 16 is a cylindrical stem portion 17 which is axially movable through a complementary opening 18 extending through the lug 5.

Pivotally mounted at 19 near the end of the stem 17, is a stop piece 26 of channel shape in cross section. When the stop piece is pivotally positioned so that it fits against and closely conforms to the shape of the stem 17 as seen in FIGS. 1 and 2, the free end of the stop piece will abut against the lug 5 if any attempt is made to axially move the holder and it will thus prevent such axial movement and will prevent the ribbed part 15 from being moved out of the serrated passage 12 of the lug 4, or to a position which would permit of rotation of the pole-holder, or that position shown in FIG. 5. However, when it is desired to shift the holder to locate its socket at a different angular position, the stop piece 26 is then pivotally moved to position at substantially right angles to the longitudinal axis of the stem 17 as shown in FIG. 5, whereupon the holder 6 can then be bodily and axially moved to bring the tapered and ribbed part 15 out of the passage 12, thereby freeing the ribs 12 from the grooves 14 and permitting the rotative movement of the holder. The holder 6 may then be rotated and when the desired angular position of the socket 7 is attained, the holder is pushed down or back to then bring its ribs 11 into engagement with the grooves 14 thereby holding the holder from any further rotative shifting movement. When the holder assumes the seated position above described, the stop piece is then pivoted to cause it to lie against the stem 17, or to the position shown in FIG. 1 and in which position the stop piece will prevent axial movement of the holder.

To facilitate the axial shift of the holder in relation to the bracket, a hand lever 20 is provided. The lever 20 is pivotally mounted at 21 in the projecting arm 22 of a bracket 23 fastened by two of the screws 2 to the base plate. The arm 22 may, if desired, be formed as a part of the base plate 3. Provided at one end of the pivoted lever 20 is a finger 24 which, upon outward swing of the lever, engages against the end of the stem 17 and acts to shift the holder 6 axially in a manner to bring the tapered and ribbed portion 15 to its extended position out of the passage 12. This movement can only be had when the stop piece 26 is swung away from the stem 17 or brought to the position shown in FIG. 5.

From the foregoing, the operation of the improved outrigger bracket or pole holder will be readily understood. The base plate 3 is securely fastened to the wall of a boat cabin or to any vertically disposed fixed part of the boat. When it is desired to adjust the rod holder to a desired position to regulate the angularity of position of the fishing rod held by the holder, the stop piece 26 is swung from the position of FIG. 1 to the position shown in FIG. 5 and the lever 20 is then manually swung outwardly, thereby causing it to elevate the holder 6 in a manner to disengage its ribs or flanges 11 from their engagement with the grooves 14. While the pole holder is in this advanced position it can be freely rotated and when the desired position of angularity of the socket 7 has been reached, the manual pressure on the lever 20 is discontinued and the holder 6 will descend to bring the ribs or flanges 11 into engagement with the grooves 14, thus locking the holder against any further rotative movement and holding the socket 7 in the desired, selected angular position. To hold the shank of the holder properly axially aligned with the passage 12, and particularly when the holder is advanced to the rotative position, the shank is formed at one end of the tapered part 15 with a ring or collar 27 of such a diameter that it fits through passage 12 but without having excessive play or wobble therein. This facilitates the re-entry of the part 15 into the passage 12.

The device shown in FIGS. 8 to 10 inclusive is similar in most ways to that which has been described, and similar parts are indicated by similar reference characters. The holder has its shank extending through two lugs 4 and 5, these lugs extending angularly from a circular disk or base plate 30 fastened by screws 31 to the surface of a deck 32 or other horizontally disposed part of a boat. The lugs 4 and 5 are connected and supported by a brace member shown at 33. This device is not provided with a hand lever for its operation and it is adjustable by drawing it longitudinally through the lugs 4 and 5 and when extended to the limit permitted by the stop piece 26, rotating it as described in connection with the embodiment of FIG. 1 and then seating it in the selected position.

In both embodiments of the invention, the angular positioning of the pole in many ways is possible. For example, in FIG. 1 the socket is disposed vertically, thus serving to hold the pole upright or cruising position. In FIG. 6, the socket is arranged at an angle of substantially 45 degrees and it projects laterally outward from the supporting bracket for a trolling position. The embodiment shown in FIG. 8 has the socket extending directly upwardly, while FIG. 10 shows the holder arranged with the longitudinal axis of the socket disposed horizontally or parallel to the surface of the deck. It will be apparent that various other arrangements of the holder are possible. As shown in FIG. 8, the bottom wall of the socket 7 may be provided with one or more drain holes 35 for the purpose of preventing the collection of water within the socket.

Having thus described a single embodiment of the invention, it is obvious that the same is not to be restricted thereto, but is broad enough to cover all structures coming within the scope of the annexed claims.

What I claim is:

1. A pole holder comprising, a bracket for attachment to a boat part, a pair of spaced lugs projecting from the bracket, a tubular socket member for receiving an outrigger pole, a shank extending integrally and at an angle from the socket member and constituting a rearward extension thereof, one of the lugs having a tapered passage extending through it, said passage being formed with a plurality of grooves, the shank having a tapered ribbed part shaped to fit in the tapered passage and to prevent rotative movement of the shank, the shank terminating at one end in a cylindrical stem, the second lug having an opening extending through it for the slidable reception of the stem, a pivoted stop piece on the stem for abutment against the second lug, the stop piece, when in one position of pivotal movement, permitting the forward axial movement of the socket member to an extent necessary to bring its ribbed portion out of the tapered passage, and when in another position preventing such movement of the socket member and retaining its ribs in engagement with the grooves.

2. An outrigger pole holder for fishing boats comprising, a bracket for attaching a holder to a boat part, a pair of lugs projecting from the bracket, a tubular socket member for receiving a fishing rod, a shank extending at an angle from the socket member and constituting an extension rearwardly from the same, one of the lugs having a tapered passage extending through it and formed with a plurality of grooves, the shank having a ribbed part shaped to fit within the tapered passage and with the ribs thereon arranged for selective engagement with the grooves, the shank terminating at one end in a cylindrical stem, the second lug having an opening extending through it for the slidable reception of the stem, and a stop on the stem for abutment against the second lug, the stop, when in one position being effective to permit axial movement of the socket member to an extent to bring its ribbed portion out of the tapered passage and when in another position preventing such longitudinal movement of the socket member, a lever pivoted on the bracket and engageable with the end of the stem for moving the socket member longitudinally when the stop member is in such a position as to permit such movement.

3. An outrigger pole holder comprising, a base member, means for attaching the base member to a fixed portion of a boat, a pole holder including a socket at one end for receiving the end of an outrigger pole, a shank integrally extending rearwardly from the socket, the socket and the shank being angularly arranged with respect to each other, the shank having a plurality of radial ribs located behind the socket, the base member being provided with a tapered passage, the ribbed portion of the shank being fitted through the passage, the passage be internally toothed to provide grooves engaged by the ribs, the pole holder being angularly adjustable relative to the base member whereby the ribbed portion of the shank may be either positioned within or out of the tapered passage and when extended out of the passage it may be freely rotated, a stop member for limiting the longitudinal movement of the pole holder with respect to the base, and a lever for longitudinally moving the pole holder to and from its engagement with the tapered passage and to extent its ribbed portion out of the toothed passage.

References Cited by the Examiner
UNITED STATES PATENTS

| | | | |
|---|---|---|---|
| 1,035,739 | 8/12 | Raes | 248—40 |
| 2,646,240 | 7/53 | Anderson | 248—207 |

CLAUDE A. LE ROY, *Primary Examiner.*